Sept. 5, 1961  R. H. McCULLOUGH  2,998,747
VIGNETTING DEVICES
Filed May 9, 1955  3 Sheets-Sheet 1

INVENTOR.
RUSSELL H. McCULLOUGH
BY
Kenyon & Kenyon
ATTORNEYS.

Sept. 5, 1961  R. H. McCULLOUGH  2,998,747
VIGNETTING DEVICES
Filed May 9, 1955  3 Sheets-Sheet 2
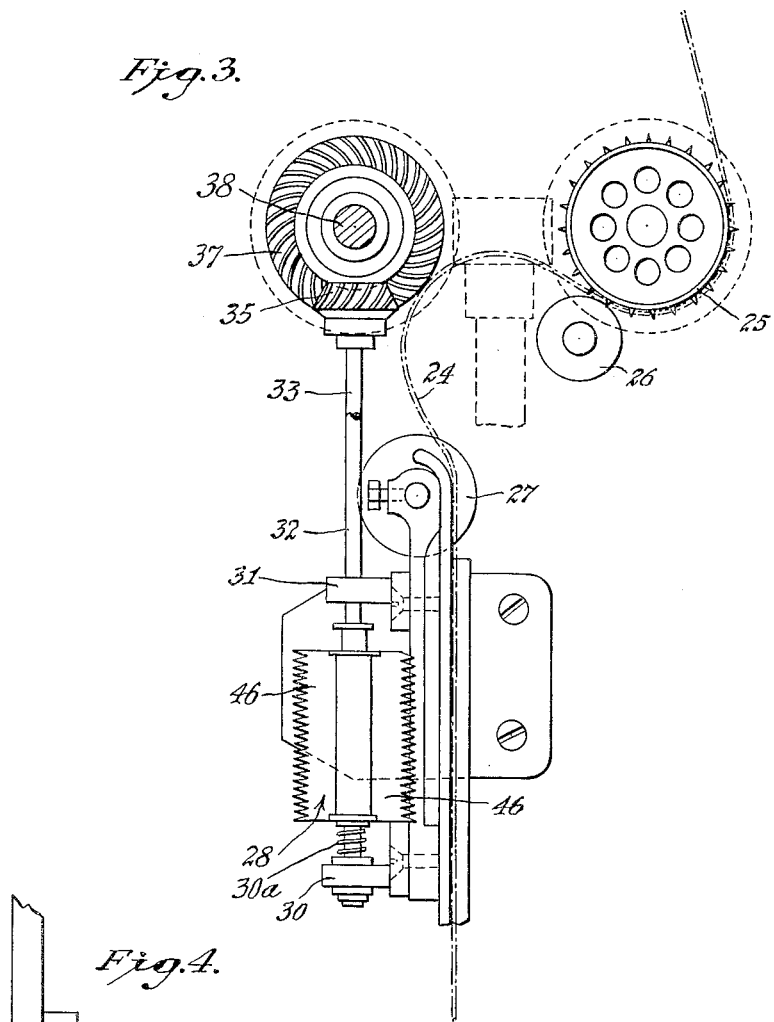
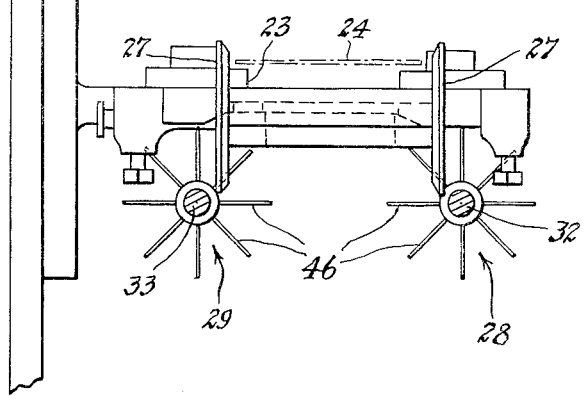
INVENTOR.
RUSSELL H. McCULLOUGH
BY
Kenyon & Kenyon
ATTORNEYS.

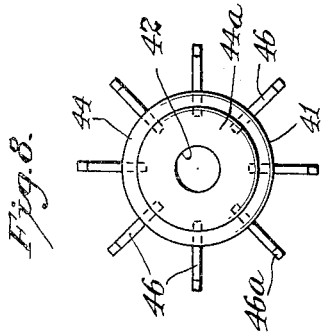
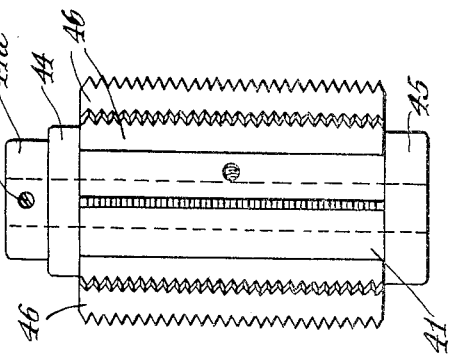
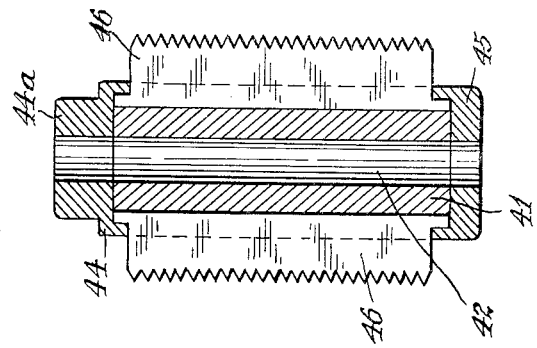
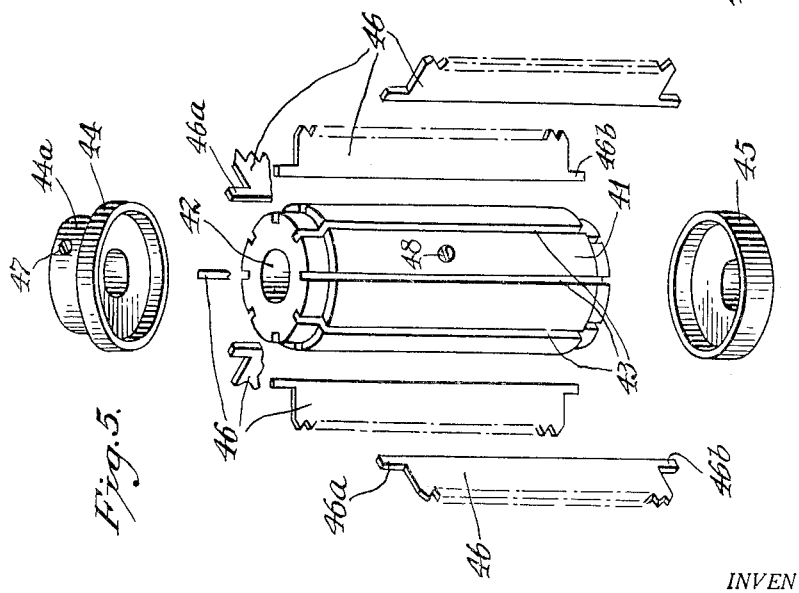

United States Patent Office 2,998,747
Patented Sept. 5, 1961

2,998,747
VIGNETTING DEVICES
Russell H. McCullough, Los Angeles, Calif., assignor, by mesne assignments, to C-M Equipment Corporation, Los Angeles, Calif., a corporation of Delaware
Filed May 9, 1955, Ser. No. 507,067
3 Claims. (Cl. 88—16.6)

The present invention relates generally to vignetting devices for motion picture apparatus, and more particularly to rotating vignetting devices adapted to merge the contiguous edges of the separate image components which make up a larger mosaic picture.

In the production of mosaic pictures it is conventional to employ a plurality of projectors which simultaneously cast the separate image components on different sections of a panoramic screen. Difficulty has been experienced in obtaining mosaic pictures without visible lines in the zones where the separate images come together. One reason has been that aperture masks placed in the projectors for controlling the location of the image margins cannot be disposed in the exact plane for which the projector is focused. The resultant blurred images of the mask edges produce overlapping areas composed of bands of light and dark lines. Moreover, even if the masks are made with high accuracy, the edges thereof are adversely affected by heat, wear and accumulated dirt from the motion picture film. The intense heat developed at the aperture of the projector is such as to distort or expand the dimensions of the conventional mask.

Where the mask dimensions are too small, a black line will appear in the region at which the contiguous images should come together. On the other hand, an oversize mask will give rise to overlapping margins producing a bright line having double the light intensity of the adjacent image area. In any event, the regions at which the image components come together are clearly perceptible and the panoramic effect is seriously impaired.

Accordingly, it is the principal object of the present invention to provide means which effectively merge the separate images of a mosaic picture into one another with no perceptible match lines therebetween.

More particularly, it is an object of the invention to provide at the aperture of a motion picture projector, rotary vignetting devices to produce a vignetted margin along one or more edges of a projected image for a mosaic picture.

Still another object of the invention is to provide a vignetting assembly constituted by a plurality of interchangeable blades mounted on a rotary drum. A significant feature of the invention resides in the use of a high speed rotary vignetting device which in addition to producing a vignetted margin also serves to carry heat away from the aperture of the projector.

Briefly stated, in accordance with the invention, a vignetting device is combined with a motion picture projector including a film aperture and a mechanism for conveying the film along the aperture to produce a screen image when a light beam is projected through the aperture. The device comprises a rotary barrel disposed adjacent one edge of the aperture and having a plurality of blades extending radially therefrom, which blades have a tortuous or serrated edge. When the barrel is rotated at high speed, the blades sequentially mask the edge of the aperture to produce gradations of light at the margin of the projected image. By the use of such vignetting devices in two or more projectors producing a mosaic picture, the contiguous edges of the projected image components are caused to merge.

For a better understanding of the invention as well as other objects and further features thereof, reference is had to the following detailed description to be read in conjunction with the accompanying drawing, wherein like components in the several views are identified by like reference numerals.

In the drawing:

FIG. 3 is a side view of said projector;

FIG. 4 is a plan view of said projector;

FIG. 5 is an exploded view of a vignetting barrel assembly in accordance with the invention;

FIG. 6 is a front elevation view of the vignetting barrel assembly;

FIG. 7 is a longitudinal sectional view taken centrally through said barrel assembly;

FIG. 8 is a top plan view of said assembled barrel.

Figure 1:
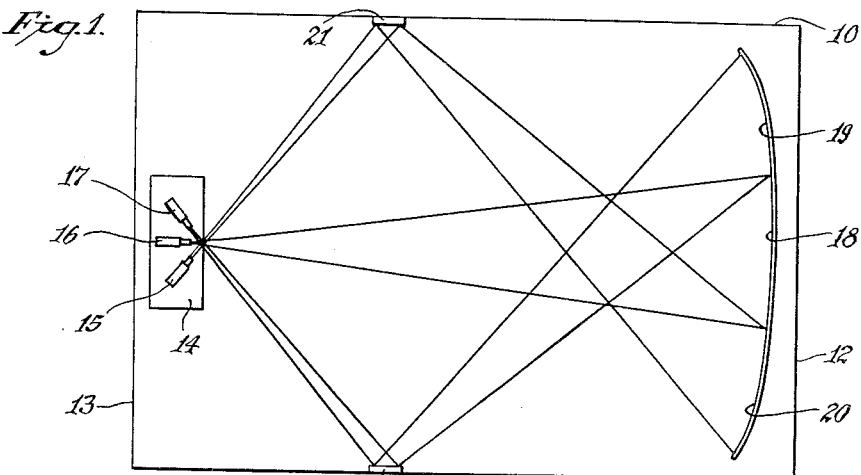
FIG. 1 is a plan view of a theater having a mosaic picture installation.

Referring now to the drawings and more particularly to FIGURE 1, a motion picture theater installation for presenting mosaic pictures is shown, the theater comprising side walls 10 and 11 and front and rear walls 12 and 13. A projection booth 14, at the rear of the theater, houses three projectors 15, 16 and 17 which are closely spaced to form a group of projectors. Disposed at the front of the theater is a panoramic screen having a substantially flat central portion 18 and two concave end portions 19 and 20. These three screen portions constitute a continuous seamless screen which is horizontally elongated to fill substantially the full width between side walls 10 and 11.

Central projector 16 is aimed directly at the central screen portion 18. Projector 15 is for screen portion 20 and this projector and the associated screen portion are oppositely oriented diagonally so as to point towards or face side wall 10. A suitable reflector or mirror 21 of good optical properties is mounted on side wall 10 at a position where it reflects the image from projector 15 directly to the smaller portion. Similarly, projector 17 and screen portion 19 are provided with a reflector 22 on side wall 11 to serve the same purpose described in connection with projector 15 and screen portion 20, except that the angularities are reversed.

Thus the three projectors cast onto the screen the three image components of the mosaic picture, the edges of the central image component being contiguous with the edges of the side image components. As pointed out previously, the object of the invention is effectively to merge the contiguous edges of the images so as to erase or render invisible the marginal zone and thereby produce the effect of a continuous mosaic picture without lines.

It is to be understood that while a three projector system has been illustrated, the invention is applicable to any mosaic installation involving two or more projectors producing contiguous image components. Moreover, while the system illustration makes use of side reflectors in conjunction with side projectors, direct cast projection may also be employed within the context of the present invention.

Figure 2:
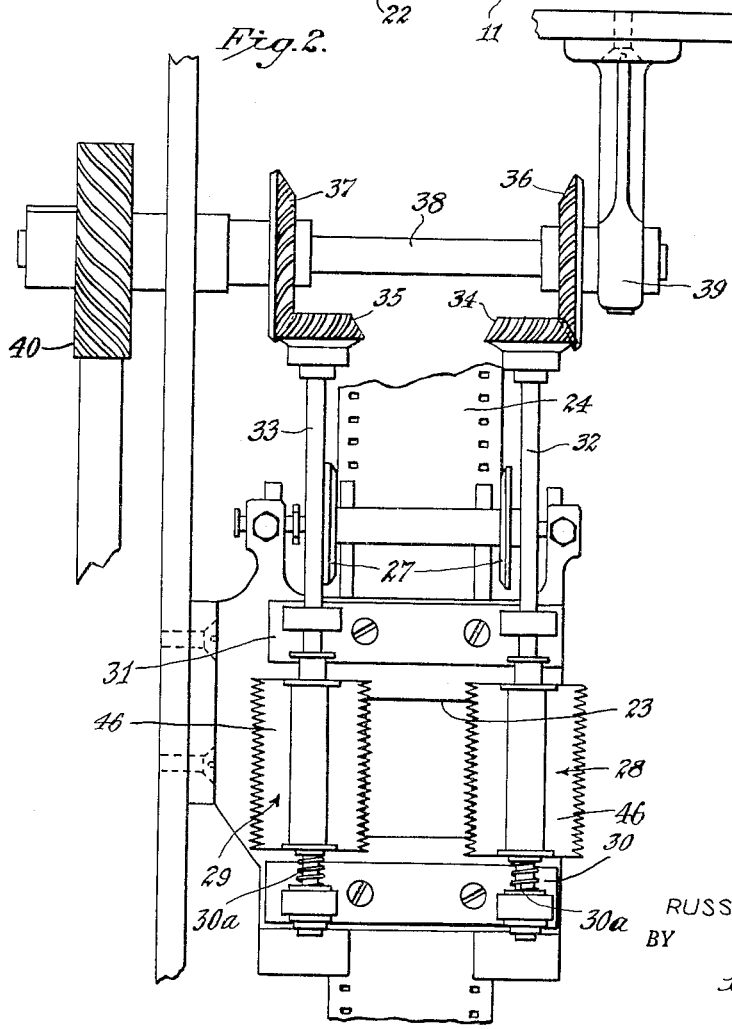
FIG. 2 is a front elevational view of a projector provided with a rotary vignetting device in accordance with the invention.

As shown in FIGS. 2, 3 and 4, a projector in accordance with the invention includes a film aperture plate 23 of conventional design. A continuous film strip 24 is conveyed over the aperture by means of a sprocket wheel 25, an upper pad roller 26 and a guide roller 27. The light source producing a beam which is projected through the aperture and the mechanism for conveying the film and the associated shutter mechanism may be of any standard design.

Mounted vertically in parallel relation on either side of the aperture are two rotatable vignetting barrel assemblies 28 and 29, the barrels carrying vignetting blades. These assemblies will be described in greater detail in connection with FIGS. 5, 6, 7 and 8. Rotatably supporting the upper and lower ends of the barrel assemblies are bracket bearings 30 and 31, the lower bearing being provided with tension spring seats 30a. The barrel assemblies 28 and 29 are mounted on shafts 32 and 33, respectively, which pass through the upper bearings 31 and terminate in bevel gears 34 and 35.

Bevel gears 34 and 35 are driven in opposing directions by means of gears 36 and 37 which intermesh with gears 34 and 35, respectively, and are mounted on a shaft 38 disposed perpendicularly relative to shafts 32 and 33, one end of shaft 38 being supported in a suspension bearing 39. Shaft 38 has a gear 40 mounted at one end thereof, which gear is driven concurrently with the means (not shown) for operating the shutter mechanism, whereby the rotation of the vignetting barrels is in synchronism with the revolving shutter operation. The ratio of gears 36 and 37 to gears 35 and 34 is such that the barrels are rotated at a relatively high speed. The vignetting blades move in a direction away from the aperture so as to draw or fan heat away therefrom, thereby providing a cooling action at the aperture as well as a vignetting effect.

As shown separately in FIGS. 5 to 8, each vignetting device comprises a drum or barrel 41 having a central bore 42 for receiving a shaft, and a plurality of equi-spaced radial slots 43 for accommodating vignetting blades, the slots extending the full length of the barrel. The end portions of the barrel are of reduced diameter to receive a top blade retaining cap 44 and bottom blade retaining cap 45, the caps being pressed onto the end portions. Received within the slots 43 are the vignetting blades 46, the exposed edges of the blades having a tortuous formation, preferably a sawtooth of variable tooth design. The inner edges of the blades are provided with extensions 46a and 46b which, when the blades are inserted in the barrel slots lie under the retaining caps, thereby holding the blades in place and preventing removal or displacement thereof. The upper cap 44 is provided with a dome 44a having a threaded bore into which is inserted a set screw 47 for keying the cap to the barrel shaft. In addition, the barrel is provided with a set screw 48 for keying the barrel to the shaft. In the embodiment shown the barrel is provided with eight interchangeable blades. Some of the blades may be eliminated when it becomes necessary to get properly synchronized matched vignetting from one picture to another.

In a three projector system, the central projector is provided with two vignetting barrels at either side of the aperture, whereas the side projector may be provided with a single barrel at the contiguous side of the aperture relative to the central projector. In operation, as the barrels are rotated at high speed, the blades serve sequentially to mask the vertical edges of the picture frame to produce marginal zones wherein the light intensity is interrupted by the teeth of the blades. By the rapid movement of the blades in and out of the picture frame, the resultant variations or gradations in light intensity of the marginal edges produces a merging effect between the contiguous edges of the separate image components.

While there has been shown what at present are considered to be preferred embodiments of the invention, it will be apparent that many changes and modifications may be made therein without departing from the essential spirit of the invention. It is intended, therefore, in the annexed claims to cover all such changes and modifications as fall within the true scope of the invention.

I claim:

1. In combination with a motion picture projector including a film aperture and means for conveying film along said aperture to produce a screen image when a light beam is projected through said aperture, a vignetting device comprising a rotary barrel disposed adjacent one edge of said aperture along an axis of rotation which is parallel to said edge and including a plurality of planar blades extending radially therefrom and having a tortuous edge portion, and means to rotate said barrel at a rapid rate to cause said blades sequentially to mask the edge of said aperture to produce gradations in the margin of the projected image.

2. In combination with a motion picture projector including a film aperture and means for conveying film along said aperture to produce a screen image when a light beam is projected through said aperture, said light beam giving rise to intense heat by said aperture, a vignetting device comprising a rotary barrel disposed adjacent one edge of said aperture along an axis of rotation which is parallel to said edge and including a plurality of planar blades extending radially therefrom and having a serrated edge portion, and means to rotate said barrel at a rapid rate in a direction at which said blades sequentially mask the edge of said aperture and move away from said aperture to carry heat therefrom, said sequential masking producing gradations in the margin of the projected image.

3. In a mosaic picture producing system, the combination comprising two projectors adapted to project individual contiguous images for a mosaic picture on a screen, a vignetting device associated with each projector to mask that edge of the image which must be matched with the image from the other projector, said device including a rotary barrel having an axis of rotation parallel to said image edge and having separately removable planar vignette blades extending radially therefrom at equi-spaced positions, said blades having a sawtooth edge, and means to rotate said barrel at a relatively high speed in a direction carrying heat away from the projector.

References Cited in the file of this patent

UNITED STATES PATENTS

| | | |
|---|---|---|
| 597,759 | Casler | Jan. 25, 1898 |
| 1,182,280 | Kennedy | May 9, 1916 |
| 2,079,995 | Hodgkins | May 11, 1937 |
| 2,204,864 | Michaelsen | June 18, 1940 |
| 2,544,116 | Waller et al. | Mar. 6, 1951 |

FOREIGN PATENTS

| | | |
|---|---|---|
| 186,993 | Great Britain | Oct. 9, 1922 |